United States Patent
Thayamballi

[19]

[11] Patent Number: 6,103,073
[45] Date of Patent: *Aug. 15, 2000

[54] MAGNETIC THIN FILM HEAD ZERO THROAT POLE TIP DEFINITION

[75] Inventor: Pradeep K. Thayamballi, Fremont, Calif.

[73] Assignee: Read-Rite Corporation, Milpitas, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/680,495

[22] Filed: Jul. 15, 1996

[51] Int. Cl.[7] .............................. C23C 14/34; B05D 5/12
[52] U.S. Cl. .................. 204/192.2; 216/22; 427/128; 427/130; 427/131; 427/523; 427/531; 205/80; 205/90
[58] Field of Search ................... 204/192.2; 216/22; 427/128, 130, 131, 523, 531; 205/80, 90

[56] References Cited

U.S. PATENT DOCUMENTS

| | | | |
|---|---|---|---|
| 4,589,042 | 5/1986 | Anderson et al. | 360/125 |
| 4,878,290 | 11/1989 | Masud et al. | 216/22 |
| 5,285,340 | 2/1994 | Ju et al. | 360/119 |
| 5,606,478 | 2/1997 | Chen et al. | 360/126 |

*Primary Examiner*—Nam Nguyen
*Assistant Examiner*—Rodney G. McDonald
*Attorney, Agent, or Firm*—Nathan N. Kallman

[57] ABSTRACT

A thin film magnetic head has a sharply defined zero throat location in the pole tip members utilizing a superior magnetic pole tip material having high resistivity and high magnetic induction. The zero throat location is defined by first depositing a first pole tip member on a first magnetic pole member which may be formed by plating and need not be composed of the same superior magnetic material as the first pole tip member. By etching the zero throat edge of the first pole tip member, a clearly defined edge location is produced. The second pole tip member of superior magnetic material is then deposited on an insulating gap layer which is formed on the lower pole tip member.

9 Claims, 3 Drawing Sheets

MAGNETIC THIN FILM HEAD ZERO THROAT POLE TIP DEFINITION

FIELD OF THE INVENTION

This invention relates in general to thin film magnetic heads, and in particular to improved pole tip structures for thin film magnetic heads.

DESCRIPTION OF THE PRIOR ART

The prior art discloses a number of configurations of thin magnetic heads, and such heads have met the requirements for magnetic recording technology for many years. In magnetic recording technology it is continually desired to improve the areal density at which information can be recorded and reliably read. As a result, the design of thin film magnetic heads has evolved to meet these changing density requirements.

Thin film magnetic heads usually include a pair of spaced magnetic pole members, a lower or leading pole member and an upper or trailing pole member, with closely spaced pole tip members which form the transducing gap used during writing or recording signals on a magnetic medium. The ends of these pole tip members form an air bearing surface (ABS) which operates in close proximity to the surface of the magnetic medium on which magnetic signals are to be recorded or written. The ends of the pole members which are located away from the ABS are joined in a rear or back gap region to provide magnetic closure for the structure.

One of the most critical technical aspects in the manufacture of thin film heads is the shaping and alignment of the magnetic pole tip members. The throat height of a magnetic head is an important dimension which must be carefully controlled to ensure optimum performance of the head. Throat height refers to the distance from the ABS of the head to the zero throat location, the zero throat location being the position away from the ABS at which the two pole members begin to diverge from each other as they extend back toward the back gap.

It is important that this zero throat location be sharply defined, and numerous solutions have been proposed in the prior art for addressing this problem. U.S. Pat. No. 5,452,164, Cole et al, describes a thin film magnetic head in which both the leading and trailing pole tips are defined prior to deposition of the trailing pole layer. This is accomplished by first forming the leading pole layer or layers, the gap layer and a lower layer for the trailing pole. The pole tip structure is then defined by etching through the trailing and leading pole layers and the gap layer, this operation serving to define both the zero throat location and the track width from the ABS to the zero throat location. This prior art approach requires etching through two dissimilar materials (the pole layers and the gap layer), which can be difficult. Also, the required etching through three layers of material can result in a lack of clear definition of the zero throat edge in the leading pole tip, which underlies the gap material and the trailing pole tip.

U.S. Pat. No. 5,285,340, Ju et al, describes a structure in which the pole tip members are formed in steps which are separate from the fabrication steps of the other portions of the magnetic structure. This is accomplished by forming an opening in a photoresist mask located on the trailing pole member and sequentially plating into the opening to produce the first and second pole tip members. This is said by Ju et al to increase the sharpness of the zero throat definition.

U.S. Pat. No. 4,589,042, Anderson et al, describes a thin film inductive head in which both the upper and lower pole members are deposited in two steps. In one step, a magnetic yoke is produced and in a subsequent step the pole tip is produced, so that the yokes and pole tips can be produced of different magnetic materials.

U.S. Pat. No. 4,839,197, Henderson, describes a thin film inductive head in which the lower magnetic pole member is produced in whole and the upper magnetic pole member is produced in parts. The first part of the upper pole member produced is the pole tip region, after which the coil is fabricated, and the remainder of the upper magnetic pole member is then produced in magnetic contact with the pole tip region and with the back gap region.

SUMMARY OF THE INVENTION

In accordance with this invention, the first or leading pole member of the magnetic head is deposited first, such as by plating, and a film of material having superior magnetic properties is then deposited on at least the end portion of the first pole member. A superior magnetic material may be defined as one having high resistivity $\rho$, high magnetic induction $B_s$, high permeability and low remanent magnetization. The combination of the superior magnetic material and the underlying pole member is then etched to define a sharp edge forming the zero throat edge. Following this, an electrically insulating non-magnetic material is applied to the combined pole member, and this insulating material is then polished to expose the superior pole material member. A gap insulation layer is then applied to the polished superior pole member surface and the insulating material.

In the next steps, the remainder of the head elements, such as electrical coils and photoresist, are applied and a second pole tip member of a superior magnetic material is formed on the insulating gap. In an alternate approach, the gap insulation material could be applied directly on the leading pole material. The superior pole material is then applied and etched to define the zero throat edge.

In magnetoresistive (MR) thin film heads, a good alignment is required between the zero throat location of the inductive write elements and the MR stripe to optimize both the writing and the readback performance. Many prior art methods for zero throat definition result in a large variation in the position of the zero throat edge. The approach proposed herein will significantly improve this relative alignment. Further, for very narrow track width write heads, a well defined alignment is required between the two poles of the write head to minimize side writing and side erasure. The methods described herein will provide the required alignment.

Most materials which provide high resistivity and high magnetic induction compared to the commonly used and plated NiFe must be formed by a dry process such as sputtering. The structures described herein allow the use of two or more dissimilar materials to form the poles, one of which could be a sputtered material, while the other can be a plated material such as NiFe or NiFeCo.

The structures of this invention have the advantage of greater precision in both the pole tip dimension and the tolerances to which the pole tip dimensions can be held. In additions other important dimensions can be more precisely defined. As a result, the thin film magnetic heads of the present invention have greatly improved side reading and side writing characteristics in narrow track applications.

DESCRIPTION OF THE PREFERRED EMBODIMENT

Figure 1A:
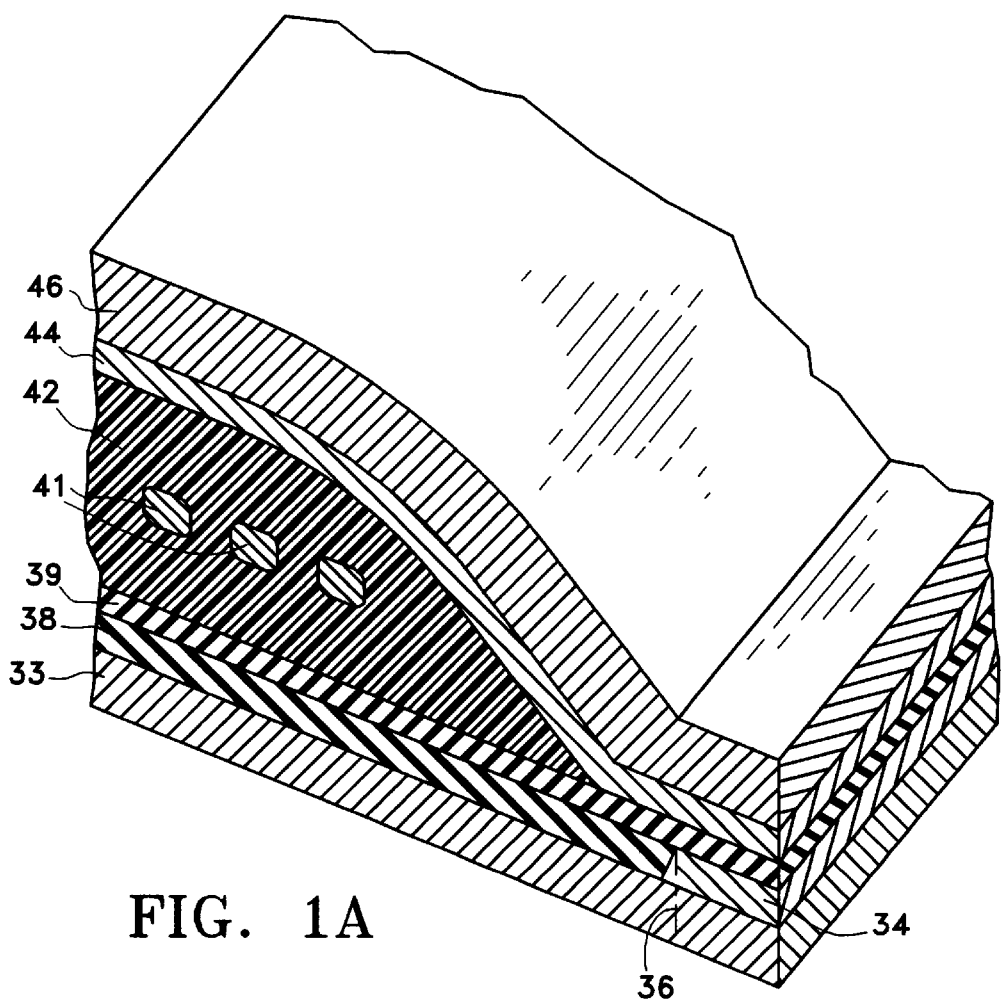
FIG. 1A is an isometric cross-sectional view of a portion of one embodiment of a thin film magnetic head fabricated in accordance with the present invention with the zero throat edge formed in the leading pole member.

With reference to FIG. 1A, numeral 33 identifies a leading or lower magnetic pole member on which is applied a layer 34 of a superior magnetic material. Layer 33 may be of NiFe which is deposited by plating, followed by deposition of layer 34 by sputtering. Layer 34 is a material having a large magnetic induction $B_s$, and a high resistivity $\rho$. Suitable materials for layer 34 include CoZrNb, CoZrTa, FeAlN, FeTaN and FeN. As an alternative construction, both layers 33 and 34 may be made of the same magnetic material. The combination of layers 33 and 34 may then be etched to define the zero throat edge, represented by line 36. In a representative embodiment of the invention, the thickness of pole tip material 34 is about 1 $\mu$m and the etching depth is of the same order. However, the depth of this etch should be at least three times greater the size of the nonmagnetic gap length between lower pole tip layer 34 and an upper pole tip layer 44. No trackwidth definition step is required at this stage.

An insulating nonmagnetic layer 38, such as aluminum oxide or silicon nitride, is then applied on layer 33, with good step coverage over the edge of pole tip layer 34 to a thickness slightly greater than the etch depth on the rear face of layer 34. The top surface of layer 34 is then polished to clearly expose the superior magnetic material therein. A layer 39 of nonmagnetic gap material is then applied to the polished top surface of layer 34 and to insulating nonmagnetic layer 38. Following this, electrical coils 41 and photoresist or other nonmagnetic insulation 42 are applied, the edge of insulation 42 closest to etched zero throat edge 36 preferably being kept either flush with or behind the zero throat edge. However, this is not a critical distance as long as the edge of insulation 42 is not closer to the ABS than the etched zero throat location, and it has only a second order effect on the writing performance of the head.

The trailing or upper pole member is then formed by depositing a layer 44 of superior magnetic material on nonmagnetic gap layer 39. If desired, layer 44 may extend past zero throat edge 36 and extend over gap layer 39 and insulation 42 to the rear of the structure, as shown in FIG. 1A. An additional magnetic layer 46 may then be deposited on layer 44 to complete the second pole structure. Layers 44, 46 may be similar in composition to layers 34, 33, respectively. The ABS or sensing edge of the structure of FIG. 1A is represented by the right hand edges of layers 33, 34, 39, 44 and 46. It will be understood that magnetic pole members 33, 44 and 46 extend rearward to form a back gap (not shown), as is well known in the art.

It can be seen from FIG. 1A that the trailing pole structure has a larger amount of magnetic material than the leading pole structure. This means that the leading pole structure will saturate at a lower flux level than the trailing pole structure, thereby resulting in better magnetic field gradients during writing.

Figure 1B:
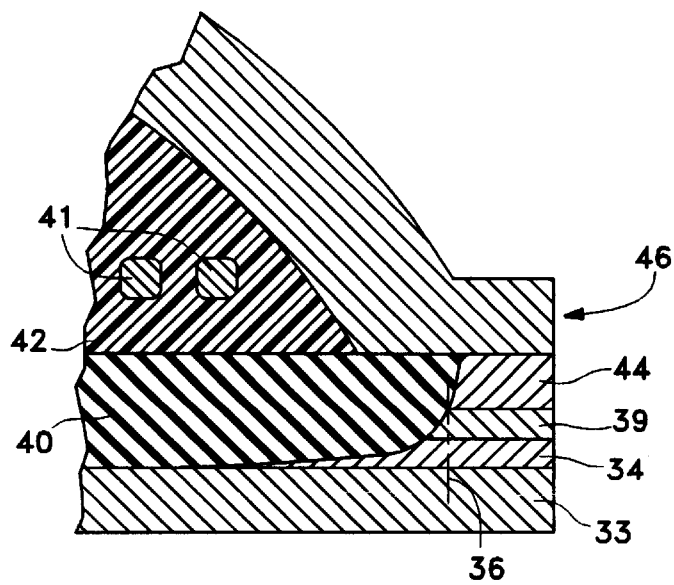
FIG. 1B is a cross-sectional side view of a portion of an alternate embodiment of the invention in which the zero throat edge is formed in the trailing pole member.
Figure 2A:
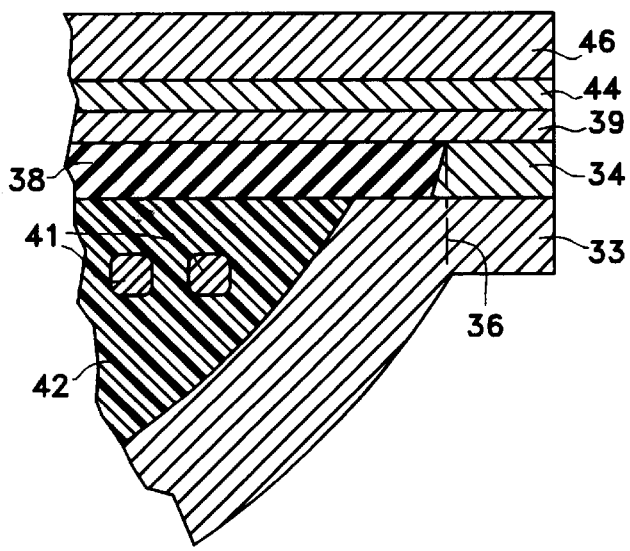
FIG. 2A is a cross-sectional side view of a portion of a cavity-type head in accordance with this invention.

FIG. 1B shows an alternate embodiment of the invention in which the zero throat edge is formed on the upper or trailing pole tip member. In such a structure, leading pole member 33, superior pole member 34 and gap 39 are formed, followed by deposition of superior pole member 44. The end of member 44 away from the ABS is then etched to define the zero throat edge 36. As shown, this etching may also extend into insulating gap 39 and layer 34. An insulating nonmagnetic layer 40 similar in composition and function to layer 38 in FIG. 1A may then be deposited on pole member 44 and gap layer 39, and then planarized to expose pole member 44. The structure of FIG. 1B also includes coils 41 and insulation 42, as well as magnetic layer 46 to complete the magnetic path for the trailing pole member.

Where the write elements are to be fabricated in a so-called recessed thin film head, such as described for example in the publication *Design And Performance Of A Recessed Thin Film Inductive Transducer*, IEEE Transactions On Magnetics, Volume 32, No. 1, January 1996, page 74, Zak et al, the coils 41 and insulation 42 can be formed before fabricating the pole tip structure 34 of the leading pole, as shown in FIG. 2A. The steps described above in connection with FIG. 1A are then employed to form pole tip layer 34, insulation 38 and zero throat edge 36. In such a construction, a uniform film of superior pole material 44 is then applied over gap insulation layer 39 to a thickness of about 1 $\mu$m. A mask is then formed to define the track edges and the pole member edges with plated NiFe. Alternatively, a thicker film of superior pole material 44 may be used to a thickness of about 2.5 $\mu$m.

Figure 2B:
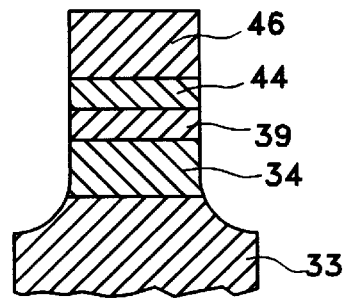
FIG. 2B is a partial cross-sectional end view of the pole tip structure of the embodiment of FIG. 2A illustrating the final track width definition.

In either case, for track width definition the pole portions are patterned with a photoresist or other sacrificial mask. The superior pole material is then etched on both poles to obtain the required track width. The etch depth into the leading pole should be a minimum of three gap depths for adequately narrow side fringing. FIG. 2B shows the structure for the final track width definition. In a recessed thin film head, the accurate definition of the zero throat location is particularly critical because the build-up of photoresist material under the trailing pole member makes sharp definition of this location difficult.

In a head where different elements are used for writing and for reading, if the write elements are to be formed before the read elements, high temperature processes can be employed to obtain good material properties for the sputtered superior pole material. Spin valve or giant magnetoresistive (GMR) multilayer read elements can be formed after the write element definition, and then the read elements do not experience any high temperature processes. In that situation, the GMR stripe is aligned to the edges of the superior pole material on the leading pole, and thus a good alignment is obtained. If the write elements are formed after the read elements, the etching of the superior pole material is aligned to the GMR stripe and track edges. In either case, a good alignment is obtained.

Figure 3A:
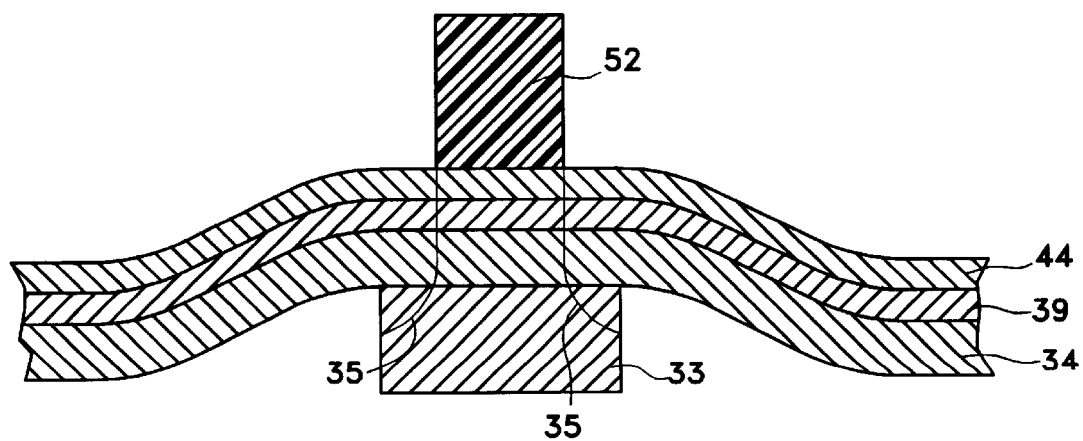
FIG. 3A is a cross-sectional side view of a portion of a magnetic head showing some of the steps in fabricating a head in which a magnetoresistive read element is to be constructed near the write portion of the head, and a shared magnetic pole for the write portion and a magnetic shield for the read portion is employed.
Figure 3B:
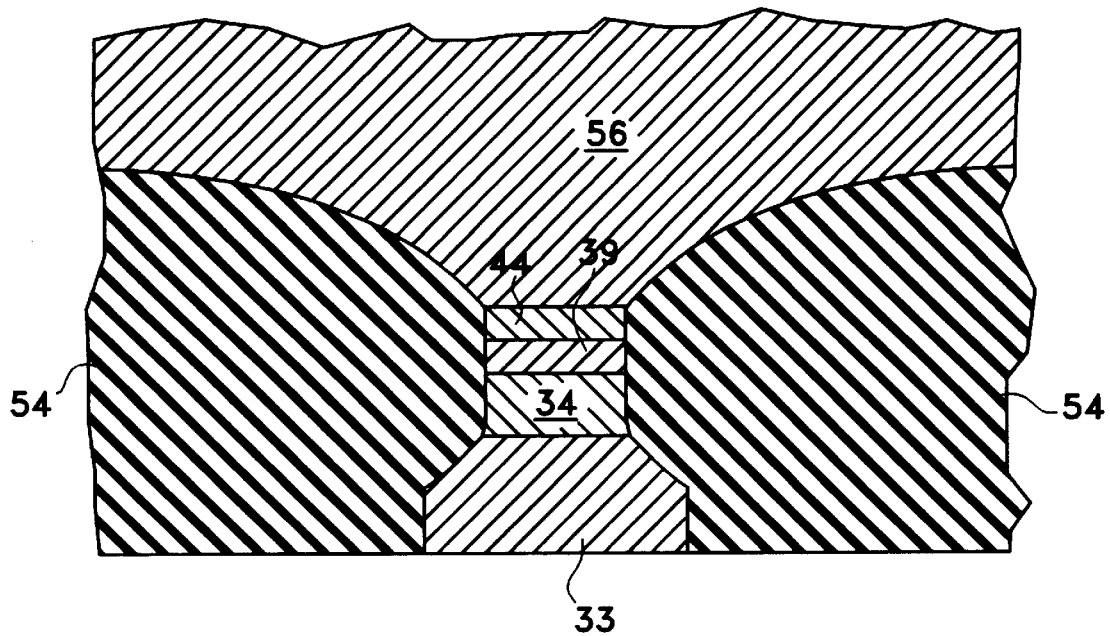
FIG. 3B shows additional steps in the fabrication of a magnetic head as in FIG. 3A.
Figure 3C:
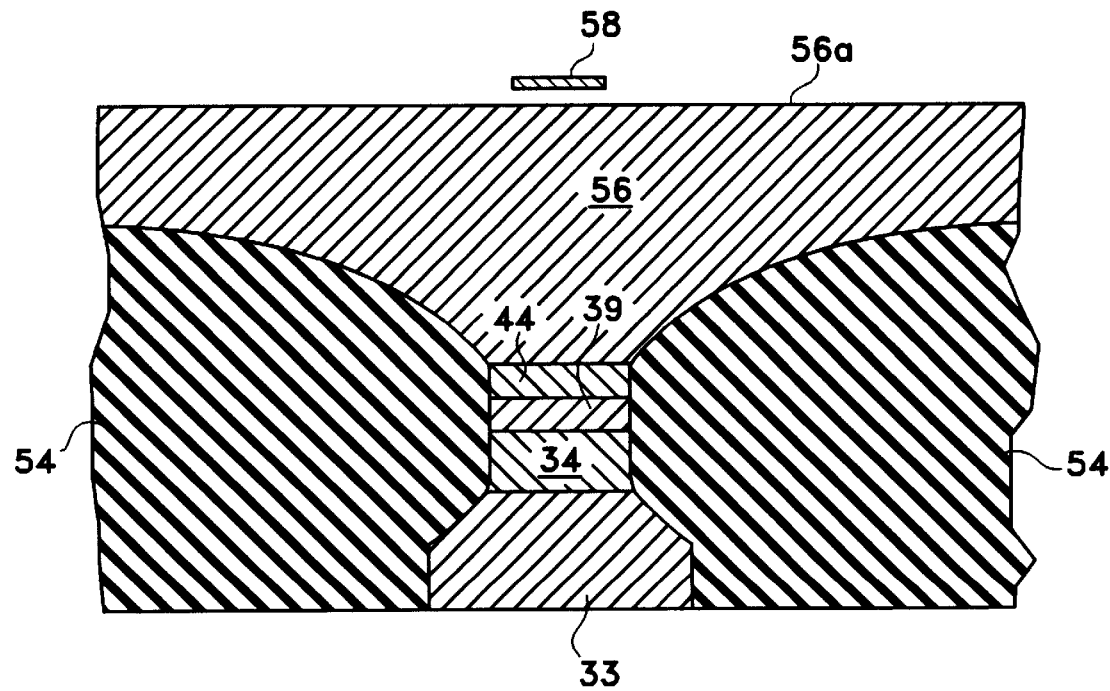
FIG. 3C illustrates further steps in the fabrication of a magnetic head as in FIGS. 3A and 3B.

If the MR or spin valve read elements are to be fabricated over the write elements, a different process as shown in FIGS. 3A, 3B, and 3C can be used to form a structure in which a magnetic member acts as a shared pole member for the write element and as a magnetic shield for the read element. This process proceeds as follows (FIG. 3A), after forming pole tip layer 34 and write gap layer 39:

1. Sputter a layer 44 of superior pole material about 1 µm thick on gap 39.
2. Form a mask 52 for defining the trailing pole tip layer.
3. Etch through the superior pole materials 34, 44 on both pole tip faces to transfer the pattern of mask 52 (as represented by dashed lines 35).
4. Deposit nonmagnetic insulating material 54 (FIG. 3B) such as aluminum oxide adjacent members 33, 34, 39, 44.
5. Remove pole mask 52.
6. Sputter a NiFe seed layer 56 on members 44, 54.
7. Form a mask for defining the shared pole, and plate the shared pole/shield. Planarize the upper surface 56a of the shared pole/shield (FIG. 3C) and fabricate a MR or spin valve sensor 58.

What is claimed is:

1. A method of fabricating a magnetic thin film head assembly including a magnetoresistive read element and an inductive write thin film transducer having a back gap region and a sensing edge, said method comprising the steps of:

first forming said inductive thin film transducer by depositing a first magnetic pole layer extending from said back gap region to said sensing edge of said magnetic thin film head;

next depositing a first magnetic pole tip layer made of a superior magnetic material on a portion of a length of said first magnetic pole layer extending from said sensing edge;

next using a first mask for defining a zero throat edge location on said first pole tip layer at a location spaced from said sensing edge by etching said first magnetic pole layer and said first magnetic pole tip layer;

next depositing a nonmagnetic insulating gap layer on said first pole tip layer;

wherein the depth of said first magnetic pole layer and said first magnetic pole tip layer is at least three times greater than the depth of said nonmagnetic insulating gap layer;

next depositing a second magnetic pole tip layer on said insulating gap layer, said second magnetic pole tip layer extending from said sensing edge toward said back gap region past said zero throat edge location;

next depositing a second magnetic pole layer made of a superior magnetic material over said second magnetic pole tip layer, said second magnetic pole layer extending from said sensing edge to said back gap region; and next defining the track width by etching and patterning the superior magnetic material of said first and second magnetic pole layers with a separate sacrificial mask;

in which said material of said first pole tip layer and said second pole tip layer has a higher resistivity and a higher magnetic induction than the material of said first pole layer and said second pole layer;

next depositing a magnetoresistive read element;

so that precise alignment between zero throat location of inductive write elements and the magnetoresistive read element is achieved to minimize side writing and side erasure.

2. A method of fabricating a magnetic thin film head in accordance with claim 1 in which said first pole tip layer and said second pole tip layer are formed of a magnetic material having different magnetic properties than the magnetic material of said first pole layer and said second pole layer.

3. A method in accordance with claim 2 in which said first and said second pole layers are deposited by plating, and said first and said second pole tip layers are deposited by sputtering.

4. A method of fabricating a magnetic thin film head in accordance with claim 1 including the step of:

depositing a layer of non-magnetic insulating material on said first magnetic pole layer after depositing said first magnetic pole tip layer on said first magnetic pole layer, said layer of insulating material being in contact with said first pole tip layer and extending toward said back gap region.

5. A method in accordance with claim 1 including the step of:

etching said first magnetic pole tip layer to define said zero throat edge location in said first magnetic pole tip layer.

6. A method of fabricating a magnetic thin film head including a magnetoresistive read element and an inductive write transducer having a back gap region and a sensing edge, said method comprising the steps of:

depositing a first magnetic pole layer extending from said back gap region to said sensing edge of said magnetic thin film head;

next depositing a first magnetic pole tip layer made of a superior magnetic material on a portion of the length of said first magnetic pole layer extending from said sensing edge;

next using a first mask for defining a zero throat edge location on said first pole tip layer at a location spaced from said sensing edge by etching said first magnetic pole layer and said first magnetic pole tip layer;

next depositing a first nonmagnetic insulating layer adjacent said zero throat edge location;

next planarizing said deposited first insulating layer and said first pole tip layer to expose a surface of said first pole tip layer;

next depositing a second nonmagnetic insulating gap layer on said planarized first pole tip layer;

next depositing a second magnetic pole tip layer made of a superior magnetic material on said insulating gap layer, said second magnetic pole tip layer extending from said sensing edge toward said back gap region past said zero throat edge location;

next depositing a second magnetic pole layer over said second magnetic pole tip layer, said second magnetic pole layer extending from said sensing edge to said back gap region; and next defining the track width by etching and patterning said magnetic pole layers with a separate sacrificial mask;

in which said material of said first pole tip layer and said second pole tip layer has a higher resistivity and a higher magnetic induction than the material of said first pole layer and said second pole layer;

next depositing a magnetoresistive read element over said second magnetic pole layer;

so that precise alignment between zero throat location of inductive write elements and the magnetoresistive read element is achieved to minimize side writing and side erasure.

7. A method of fabricating a magnetic film head in accordance with claim 6 in which said first pole tip layer and said second pole tip layer are formed of a magnetic material having different magnetic properties than the magnetic material of said first pole layer and said second pole layer.

8. A method in accordance with claim 7 in which said first and said second pole layers are deposited by plating, and said first and said second pole tip layers are deposited by sputtering.

9. A method in accordance with claim 6 including the step of:

etching said first magnetic pole tip layer to define said zero throat edge location in said first magnetic pole tip layer.

* * * * *